(12) United States Patent
Tachibana

(10) Patent No.: US 8,799,721 B2
(45) Date of Patent: Aug. 5, 2014

(54) SERVER, A METHOD, A SYSTEM AND A PROGRAM THEREOF

(75) Inventor: Katsuichi Tachibana, Tokyo (JP)

(73) Assignee: NEC Corporation, Tokyo (JP)

(*) Notice: Subject to any disclaimer, the term of this patent is extended or adjusted under 35 U.S.C. 154(b) by 223 days.

(21) Appl. No.: 13/411,429

(22) Filed: Mar. 2, 2012

(65) Prior Publication Data

US 2012/0226931 A1 Sep. 6, 2012

(30) Foreign Application Priority Data

Mar. 4, 2011 (JP) ................................. 2011-048385

(51) Int. Cl.
*G06F 11/00* (2006.01)

(52) U.S. Cl.
USPC ......................................................... 714/48

(58) Field of Classification Search
CPC ......... G06F 11/00; G06F 11/07; G06F 11/30; G06F 2003/00; G06F 3/06; H04L 41/00; H04L 43/00
USPC ...................................................... 714/1–57
See application file for complete search history.

(56) References Cited

U.S. PATENT DOCUMENTS

| | | | |
|---|---|---|---|
| 6,865,157 B1* | 3/2005 | Scott et al. .................... | 370/242 |
| 7,797,572 B2* | 9/2010 | Kawashima et al. ........ | 714/5.11 |
| 7,827,446 B2* | 11/2010 | Kimura et al. .................. | 714/43 |
| 2005/0144505 A1* | 6/2005 | Takeuchi et al. .................. | 714/4 |
| 2011/0060941 A1* | 3/2011 | Hatasaki et al. ............. | 714/4.11 |

FOREIGN PATENT DOCUMENTS

JP 2006-215682 A 8/2006

* cited by examiner

*Primary Examiner* — Nadeem Iqbal
(74) *Attorney, Agent, or Firm* — McGinn IP Law Group, PLLC

(57) ABSTRACT

A server includes a monitor unit configured to monitor a failure of one or more user networks and a recovery support unit configured to support a recovery of the failure of one or more user networks. When detecting an alarm showing occurrence of the failure, the server identifies a user network in which the failure occurs based on both line information for each user network and the alarm, and notifies the alarm to the plurality of management terminals of the identified user network.

15 Claims, 18 Drawing Sheets

Fig.10

1001 LINE DIAGRAM

```
                    LINE TERMINAL
                        DEVICE      ROUTER
                         ┌──┐        ┌──┐
    ╭─────────╮          │  │────────│  │
    │ CARRIER │──────────┤  │ CABLE  └──┘
    │ NETWORK │ ACCESS   └──┘
    ╰─────────╯  LINE
SECTION |←  A  →|←  B  →|← C →|← D →|
```

1002

| SECTION | | A | B | C | D |
|---|---|---|---|---|---|
| NAME | | CARRIER NETWORK | ACCESS LINE | LINE TERMINAL DEVICE | USER SECTION |
| MAINTENANCE RESPONSIBILITY | | COMMUNICATION CARRIER | COMMUNICATION CARRIER | COMMUNICATION CARRIER | USER |
| FIRST ACTION | RESPONDER | COMMUNICATION CARRIER | COMMUNICATION CARRIER | USER OPERATION SECTION | USER OPERATION SECTION |
| | CONFIRMATION ITEM | IN-NETWORK ALARM CONSTRUCTION INFORMATION | ACCESS LINE ALARM CONSTRUCTION INFORMATION | POWER SOURCE CONDITION LAMP CONDITION | POWER SOURCE CONDITION LAMP CONDITION |
| | ACTION | RESTORATION MEASURE (STANDBY FOR CONSTRUCTION) | RESTORATION MEASURE (STANDBY FOR CONSTRUCTION) | RESTART | RESTART |
| SECOND ACTION | RESPONDER | — | COMMUNICATION CARRIER | COMMUNICATION CARRIER | USER OPERATION SECTION |
| | CONFIRMATION ITEM | — | LINE TEST | DETAILED INVESTIGATION | DETAILED INVESTIGATION |
| | ACTION | — | RESTORATION MEASURE | DEVICE REPLACEMENT | DEVICE REPLACEMENT |
| THIRD ACTION | | — | — | — | — |

Fig.15

| CASE | ALARM | A | B | C | D | SUSPICIOUS PART | NEXT ACTION |
|---|---|---|---|---|---|---|---|
| CASE(1) | NG | ○ | ○ | ○ | ○ | (INVESTIGATION REQUIRED) | ESCALATION |
| CASE(2) | NG | ○ | ○ | ○ | ○ | (INVESTIGATION REQUIRED) | ESCALATION |
| CASE(3) | NG | ○ | ○ | ○ | ○ | (INVESTIGATION REQUIRED) | ESCALATION |
| CASE(4) | NG | ○ | ○ | ○ | ○ | (INVESTIGATION REQUIRED) | ESCALATION |

1500

SERVER, A METHOD, A SYSTEM AND A PROGRAM THEREOF

This application is based upon and claims the benefit of priority from Japanese patent application No. 2011-048385, filed on Mar. 4, 2011, the disclosure of which is incorporated herein in its entirety by reference.

BACKGROUND

The exemplary embodiments of the present invention relate to a server, a method, a system and a program thereof. Especially these embodiments relate to a server, a method, a system and a program thereof which support a recovery of a failure in a communication line.

In a related technology, JP-A-2006-215682 (Patent Document 1) discloses a technology for supporting maintenance of a device in which a failure occurs.

In the above related technology, it is possible to increase an efficiency of the maintenance. However, there is no system in which relevant parties efficiently support the recovery while cooperating together and sharing information. When a user uses a different line service or line services provided by a plurality of communication carriers, it is difficult to perform unified measures in the communication lines and it is required to perform measures corresponding to each of the communication carriers and each of types of the line services when a failure occurs.

An object of the exemplary embodiments of the present invention is to provide a server, a method, a system and a program thereof capable of supporting the recovery of the failure efficiently by sharing failure and recovery information among persons concerned.

SUMMARY OF THE INVENTION

According to a non-limiting illustrative embodiment, a server comprising: a monitor unit configured to monitor a failure of one or more user networks; and a recovery support unit configured to support a recovery of the failure of one or more user networks, wherein when detecting an alarm showing occurrence of the failure, the server identifies a user network in which the failure occurs based on both line information for each user network and the alarm, and notifies the alarm to the plurality of management terminals of the identified user network.

According to another non-limiting illustrative embodiment, a recovery support server connected to a plurality of management terminals which manage one or more user networks, comprising: an identification unit configured to identify a user network where a failure occurs based on both line information for each user network in a line database and an alarm of one or more user networks; a notification unit configured to notify the alarm to the plurality of the management terminals of the identified user network; a receiving unit configured to receive confirmation result for the alarm from the plurality of the management terminals; and a determination unit configured to determine an action for the recovery of the failure based on the confirmation result.

According to another non-limiting illustrative embodiment, a method, comprising: monitoring a failure of one or more user networks in a monitoring step; and supporting a recovery of the failure of one or more user networks in a supporting step, wherein the supporting step comprises: identifying a user network in which the failure occurs based on both line information for each user network and an alarm showing occurrence of the failure when detecting the alarm; and notifying the alarm to the plurality of management terminals of the identified user network in a notifying step.

According to another non-limiting illustrative embodiment, a system comprising: one or more user network; a plurality of management terminals configured to manage the user network; and a server configured to monitor a failure of one or more user networks and support a recovery of the failure of one or more user networks, wherein when detecting an alarm showing occurrence of the failure, the server identifies a user network in which the failure occurs based on both line information for each user network and the alarm, and notifies the alarm to the plurality of the management terminals of the identified user network.

According to another non-limiting illustrative embodiment, a computer readable medium recording thereon a program for enabling a computer to carry out the following: monitoring a failure of one or more user network in a monitoring step; and supporting a recovery of the failure of one or more user network in a supporting step, wherein the supporting step comprises: identifying the user network in which the failure occurs based on both line information for each user network and the alarm when detecting an alarm showing occurrence of the failure; and notifying the alarm to the plurality of management terminals of the identified user network in a notifying step.

BRIEF DESCRIPTION OF THE DRAWINGS

Other features and advantages of various embodiments of the present invention will become apparent by the following detailed description and the accompanying drawings, wherein:

FIG. 10 is a table representing confirmation items of sections A to D monitored with the monitoring server;

FIG. 15 is a diagram illustrating contents of a third action of the recovery support program;

DETAILED DESCRIPTION

A first exemplary embodiment of the present invention will be described in detail below.

Exemplary embodiments of the present invention are described in detail as examples referring to drawings. Elements or components described in following exemplary embodiments are just examples. The scope of the invention is not limited to the elements or the components.

(1) First Exemplary Embodiment

Figure 1:
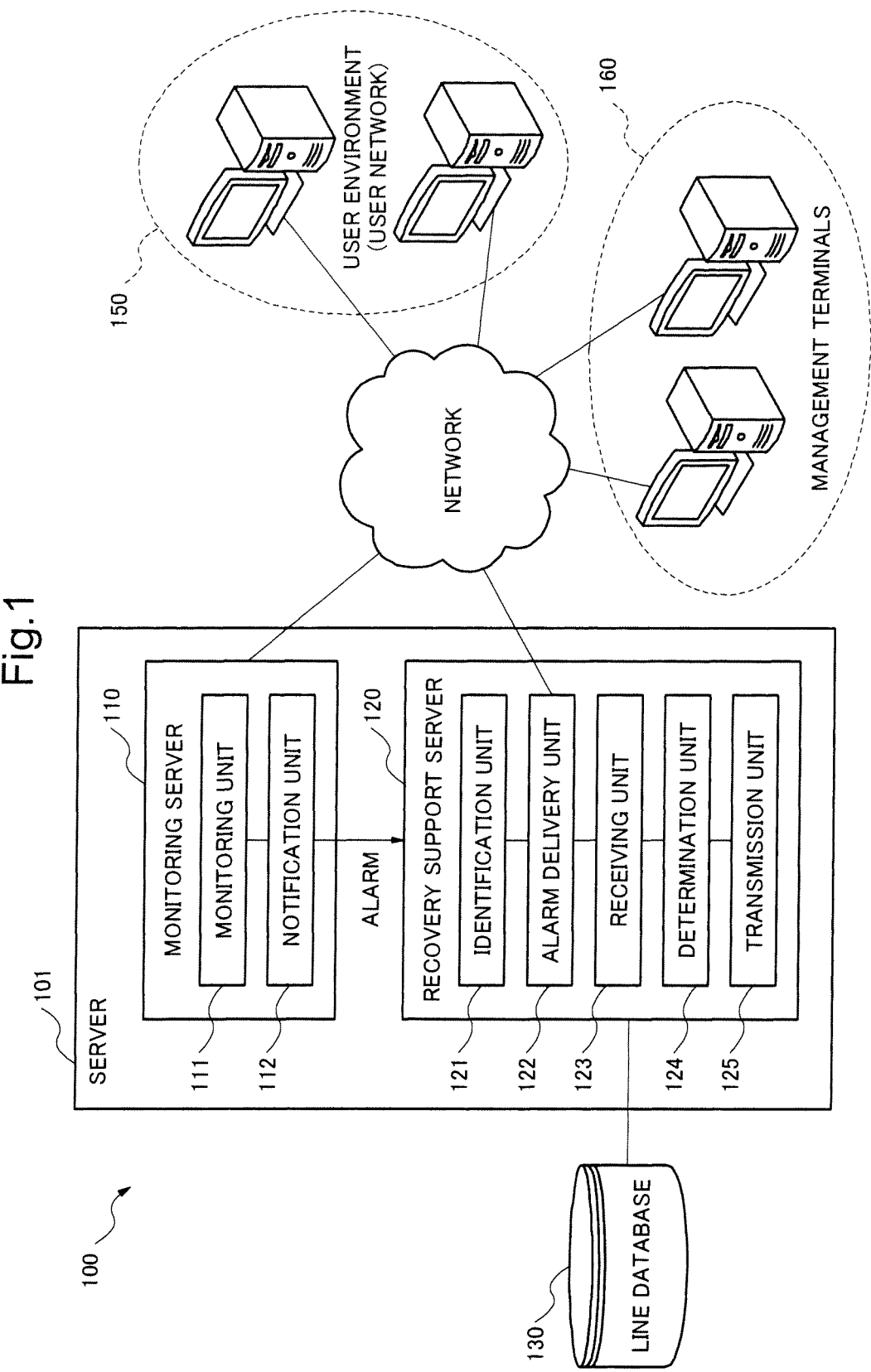
FIG. 1 is a block diagram illustrating a configuration of a system in a first exemplary embodiment of the present invention.

A system such as an information processing system 100 is described as a first exemplary embodiment using FIG. 1. As shown in FIG. 1, the information processing system 100 includes a monitoring server 110, a recovery support server 120 as a recovery support unit, and a line database 130.

The monitoring server 110 includes a monitoring unit 111 and a notification unit 112. The recovery support server 120 includes an identification unit 121, an alarm delivery unit 122, a receiving unit 123, a determination unit 124, and a transmission unit 125.

The monitoring unit 111 included in the monitoring server 110 monitors a failure in a user network such as one or more user communication environments (user networks) 150. The notification unit 112 notifies the recovery support server 120 of an alarm showing an occurrence of the failure.

The identification unit 121 included in the recovery support server 120 identifies the user communication environment 150 where the failure occurs based on the alarm referring to the line database 130. The alarm delivery unit 122 notifies a plurality of terminals 160 managing the user communication environment 150 of the alarm. The receiving unit 123 receives a confirmation result for the alarm from the terminals. The determination unit 124 determines an action to be taken on the side of the terminals based on the confirmation result. The transmission unit 125 transmits the action determined in the determination unit 124 to the terminals.

Figure 18:
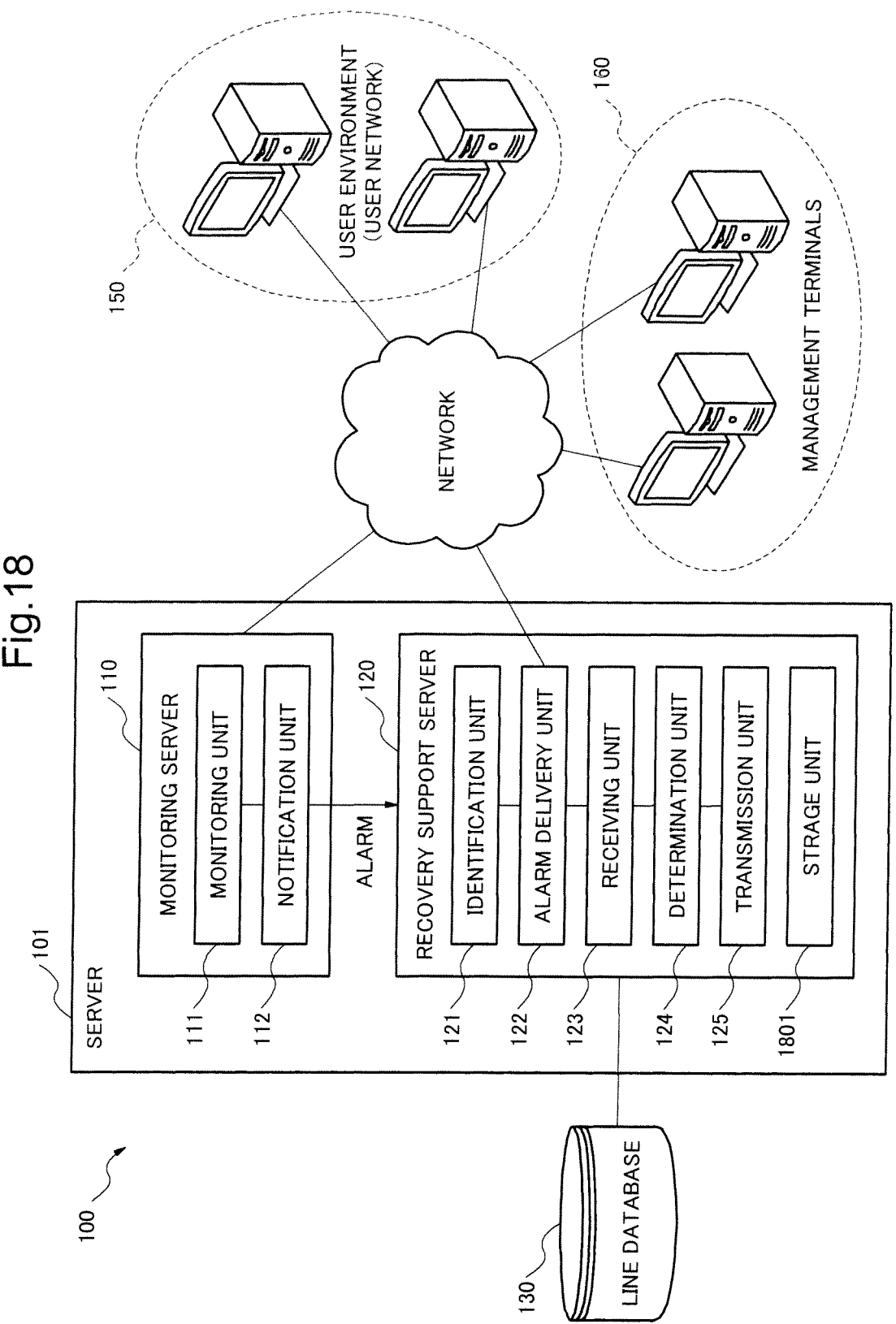
FIG. 18 is a block diagram illustrating a configuration of a system in a first exemplary embodiment of the present invention.

Furthermore, as shown in FIG. 18, a recovery server may include a storage unit 1801. The storage unit 1801 stores the confirmation result for the alarm sent from the terminal. The terminal can browse the information including the confirmation result and update the confirmation result.

According to the exemplary embodiment, based on the configuration and the operations, the monitoring server always monitors occurrence of the failure in the user communication environment. Since the action to recover a line failure is promptly performed by the recovery support server when the failure occurs, prompt recovery of the failure in the user communication environment is achieved.

That is to say, in this exemplary embodiment, failure information as the alarm is delivered to a plurality of terminals which manage the user communication environment, confirmation and measure for recovery is prompted, and the recovery support server executes a total determination by collecting a confirmation result for the alarm. As a result, it is possible for people concerned to share failure and recovery information in the user communication environment. So, the prompt recovery of the failure in the user communication environment is achieved.

(2) Second Exemplary Embodiment

Figure 2:
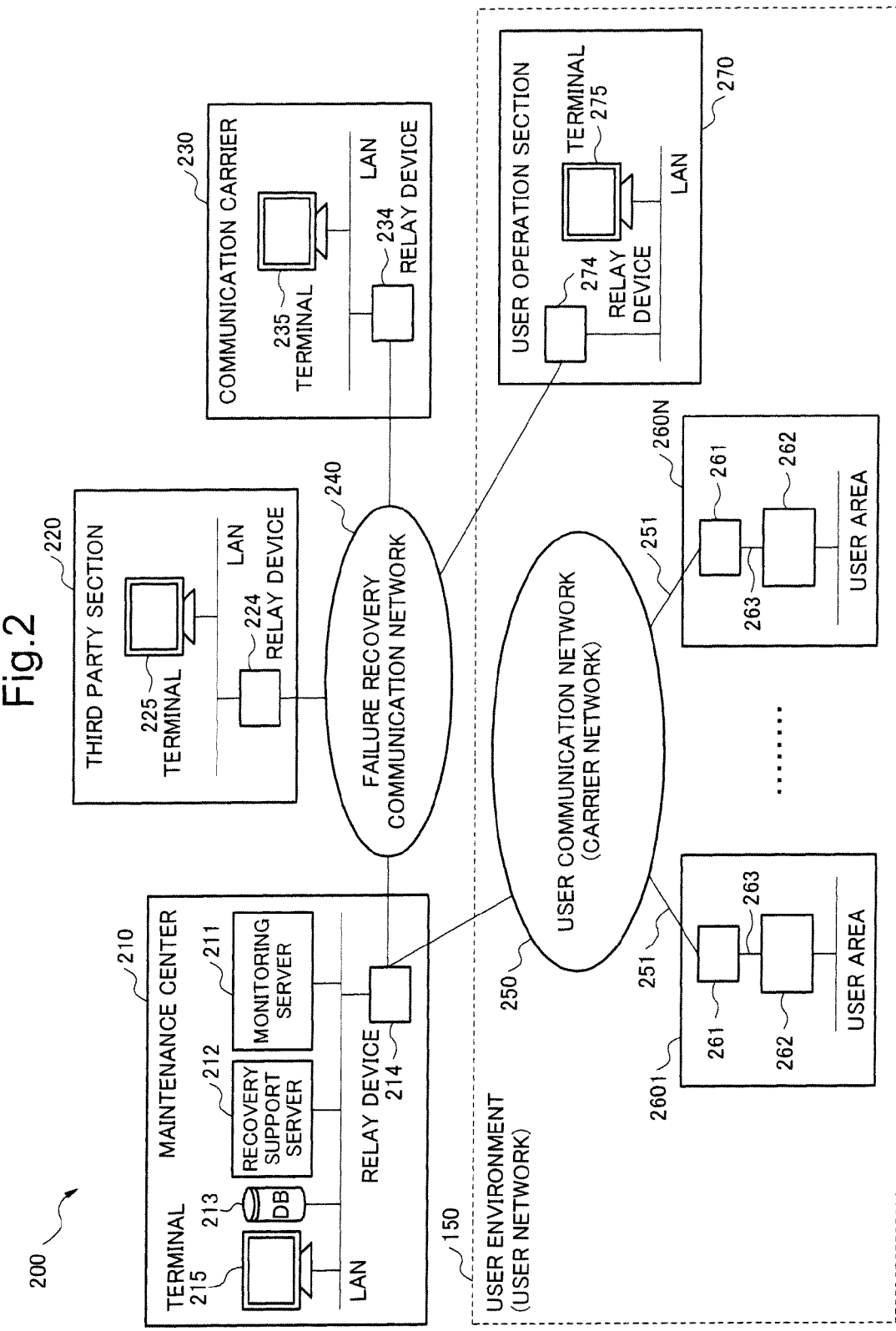
FIG. 2 is a block diagram illustrating a configuration of a system in a second exemplary embodiment of the present invention.

A system such as an information processing system 200 is described as a second exemplary embodiment using FIG. 2. As shown in FIG. 2, the information processing system 200 includes a maintenance center 210 which performs recovery measures when a line failure occurs, a third party section 220, a communication carrier 230, and a user communication network (carrier network) 250 which has a subscription contract with the carrier. The information processing system 200 further includes a user operation section 270 connected with user areas 2601 to 260N through a failure recovery network 240. The user communication network 250 is connected with the user areas 2601 to 260N through an access line 251.

[Configuration of System]

Specifically, the information processing system 200 includes following components. The maintenance center 210 includes a monitoring server 211, a recovery support server 212, a line database 213, a relay device 214, and a terminal 215. The third party section 220 includes a relay device 224 and a terminal 225. The communication carrier 230 includes a relay device 234 and a terminal 235. The user communication network 250 is a line service provided by the communication carrier, like an IP-VPN, wide-area Ethernet (trade mark), an entry VPN, Internet, or the like. However, the network 250 is not limited to the above. The user area 2601 includes a line terminating device 261, a WAN (wide area network) router 262 and a communication cable 263. A LAN (local area network) in each user area is located ahead of WAN routers 262 to 26N. The LAN may have any configuration. The user operation section 270 includes a relay device 274 and a terminal 275.

The maintenance center 210 monitors the user communication network device 250, the line terminating device 261, the communication cable 263, and the WAN router 262, monitors a failure which occurs in these sections, and performs recovery measures for the failure. The maintenance center 210 activates a failure recovery program instantly and starts recovery, when the failure occurs in the monitoring sections. The monitoring server 211 monitors conditions of sections from the maintenance center 210 to each WAN router 262 in the user areas 261 to 26N through the user communication network 250 by using a ping (Packet Internet Grouper) or the like. The terminal 215 of the maintenance center 210 can browse alarm information from the monitoring server 211 and can perform inputting and outputting of various kinds of information of the recovery support server 212.

The failure recovery communication network 240 is connected with the maintenance center 210 through the relay device 214 connected with the router bringing the LAN together. The failure recovery communication network 240 is connected with the communication carrier 230 providing the user communication network 250, and the like, the user operation section 270 handling a line operation or a network operation for a user, and the third party section 220.

The communication carrier 230 is connected with the failure recovery communication network 240 through the relay device 234, and provides a user with the line service (user communication network 250, access line 251, line terminating device 261). The terminal 235 is placed in the communication carrier 230 through the relay device 234 and the LAN connected therewith. It is possible to browse information in the recovery support server 212 and input information, in the terminal 235.

The user operation section 270 is connected with the failure recovery communication network 240 through the relay device 274 and handles a network operation in the user areas 2601 to 260N. The terminal 275 is placed in the user operation section 270 through the relay device 274 and the LAN connected therewith. It is possible to browse information of the recovery support server 212 and input information, by using the terminal 275. The user operation section 270 handles a part which is not provided by the communication carrier 230, that is, operations for the communication cable 263 and the WAN router 262. The user operation section 270 may be located in any one of the user areas.

The third party section 220 is connected with the failure recovery communication network 240 through the relay device 225 and handles the other works except the operations. The terminal 225 is placed in the third party section 220 through the LAN connected with the relay device 224. It is possible to browse a recovery state from a failure after occurrence of the line failure by using the terminal 225. The third party section 220 may be placed in a section which wants share of failure information, like an administration section of a maintenance service. However, the third party section does not necessarily have to be placed.

The monitoring server 211 in the maintenance center 210 monitors the section from the user communication network 250 to each user communication device, specifically to the WAN router 262 in each of user areas 2601 to 260N, by using a ping. On detecting a ping error, the monitoring server 211 determines whether or not a failure occurs. When the failure occurs, the monitoring server 211 transmits the IP address of the user area where communication line cutoff (communication disconnection) occurs and information about the time when the communication disconnection is detected to the recovery support server 212 as the alarm information.

Figure 6:
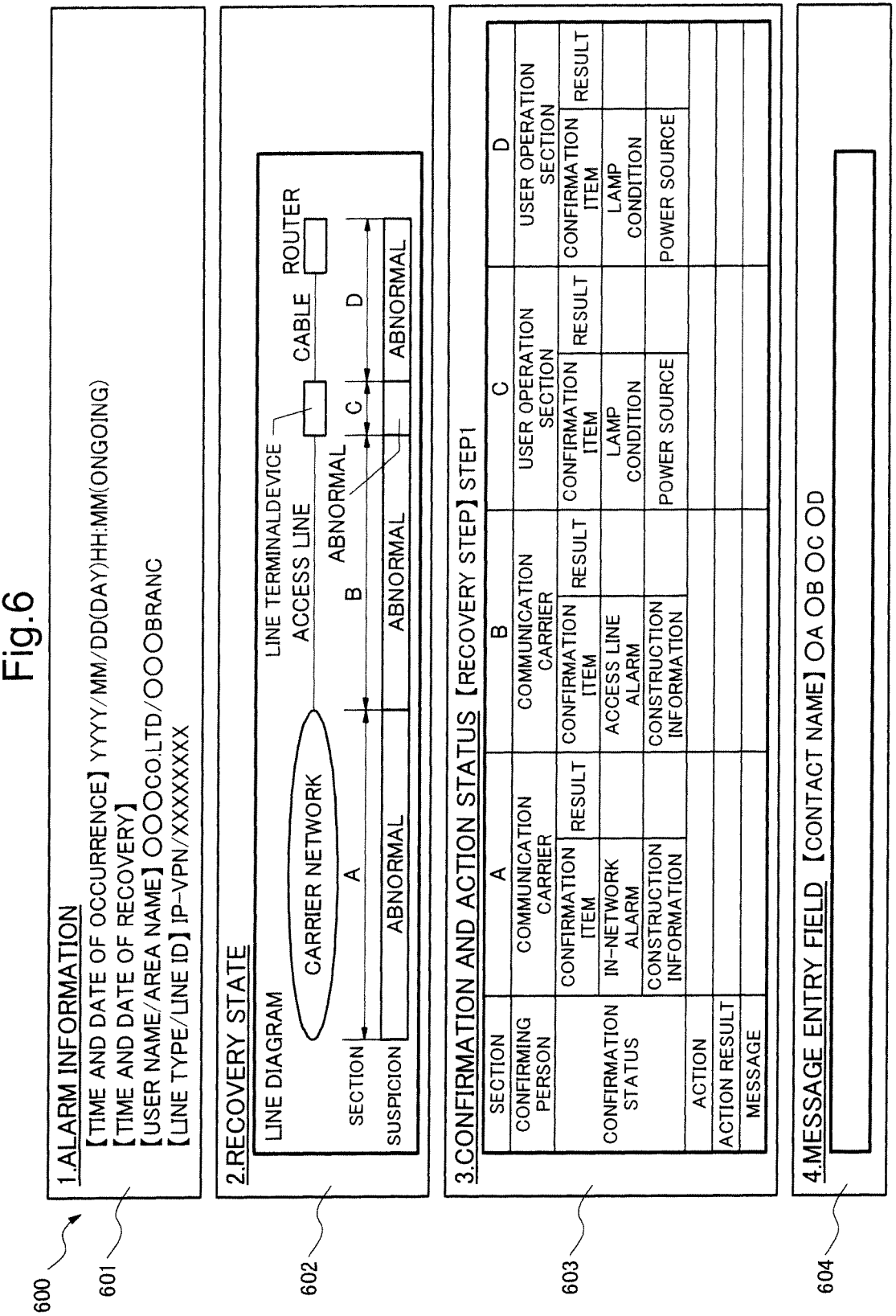
FIG. 6 is a diagram illustrating an example of a screen displayed on a terminal of a maintenance center.
Figure 7:
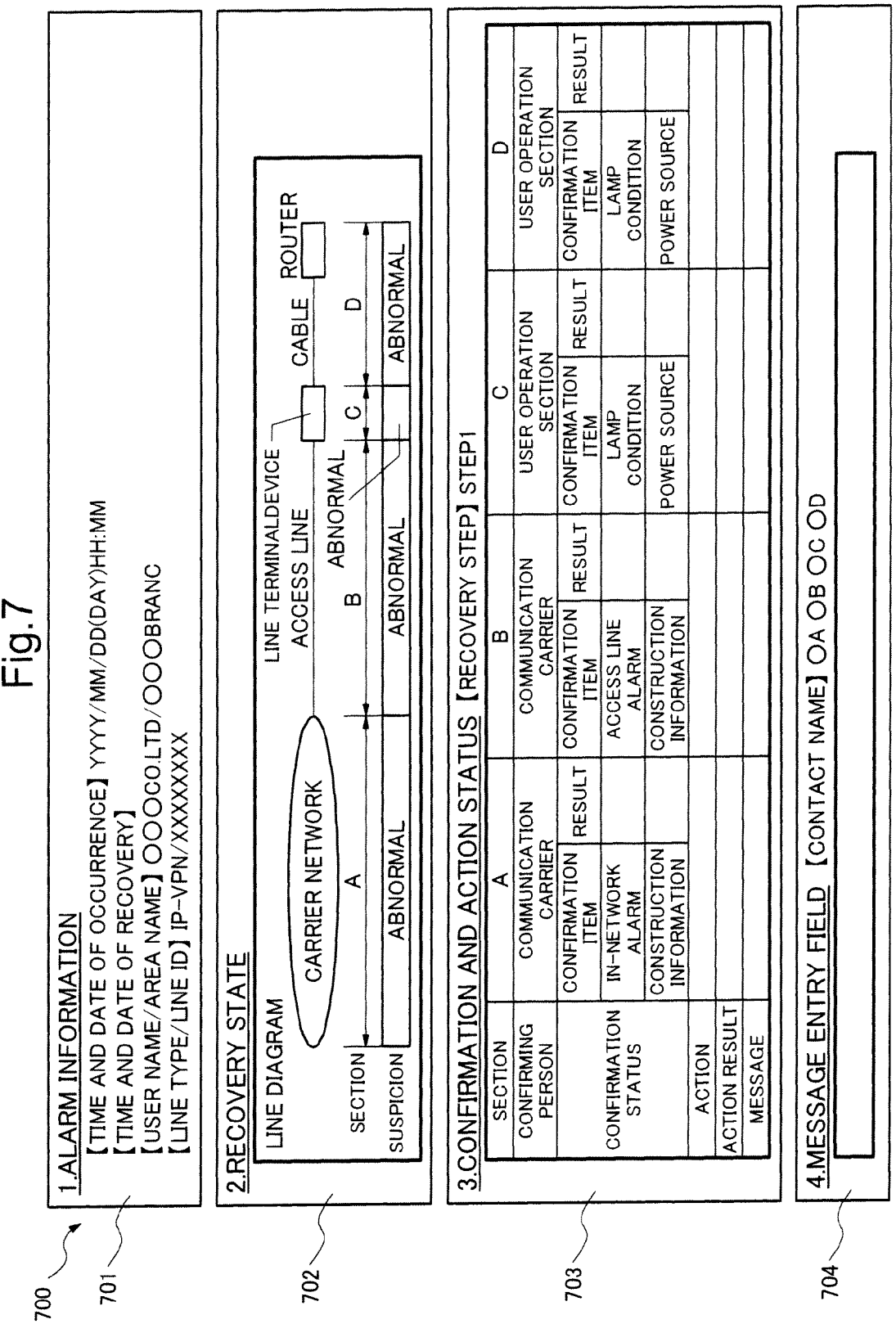
FIG. 7 is a diagram illustrating an example of a screen displayed on a terminal of a user operation section.
Figure 8:
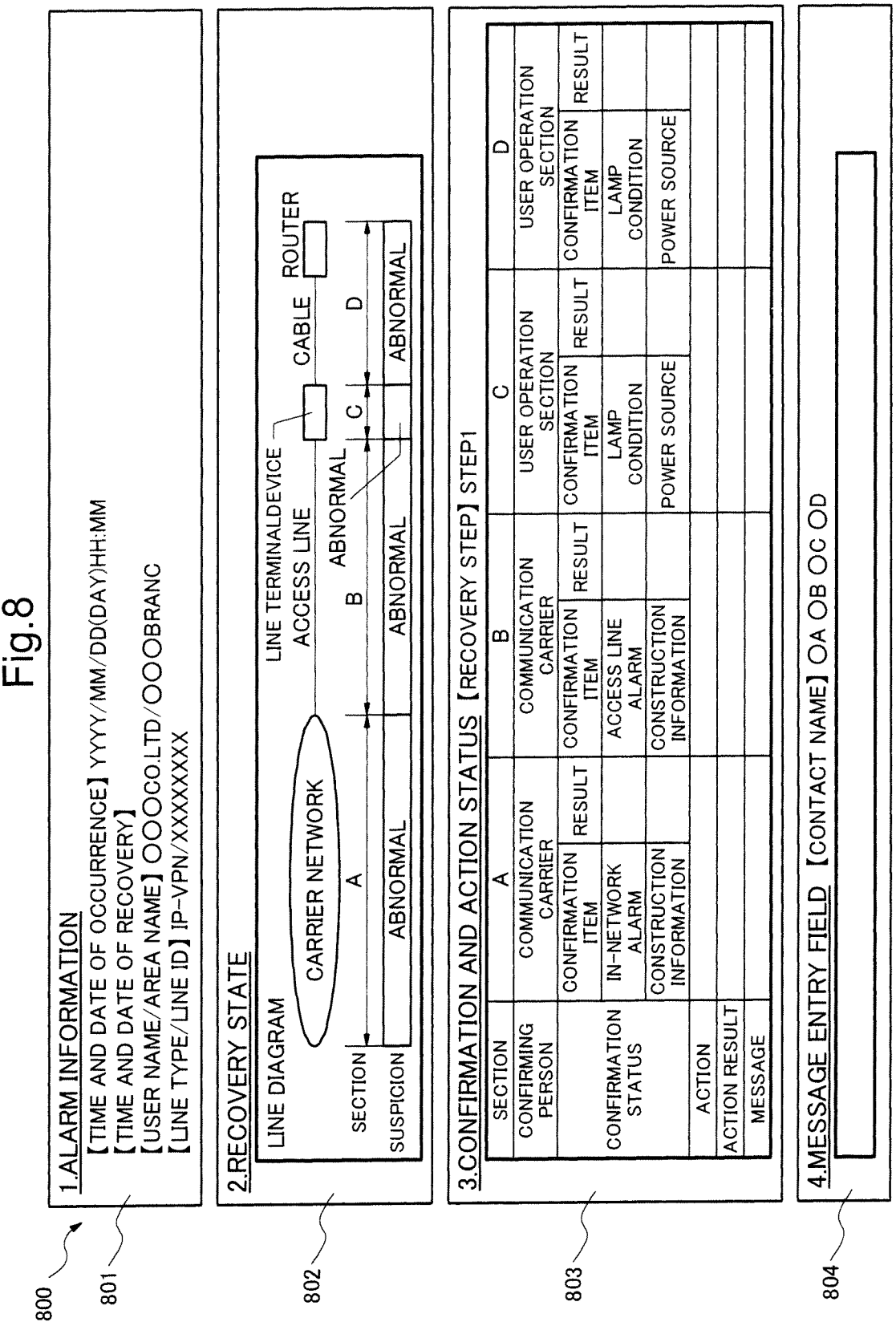
FIG. 8 is a diagram illustrating an example of a screen displayed on a terminal of a communication carrier.

The recovery support server 212 searches and identifies pertinent line information from the IP address of the area where the alarm occurs, referring to the line database 213. The recovery support server 212 delivers the alarm on line failure occurrence to the terminal 215 in the maintenance center, the terminal 275 of the user operation section and the terminal 235 of the communication carrier simultaneously. Information displayed in each terminal at this time is shown in FIG. 6, FIG. 7, and FIG. 8.

Figure 9:
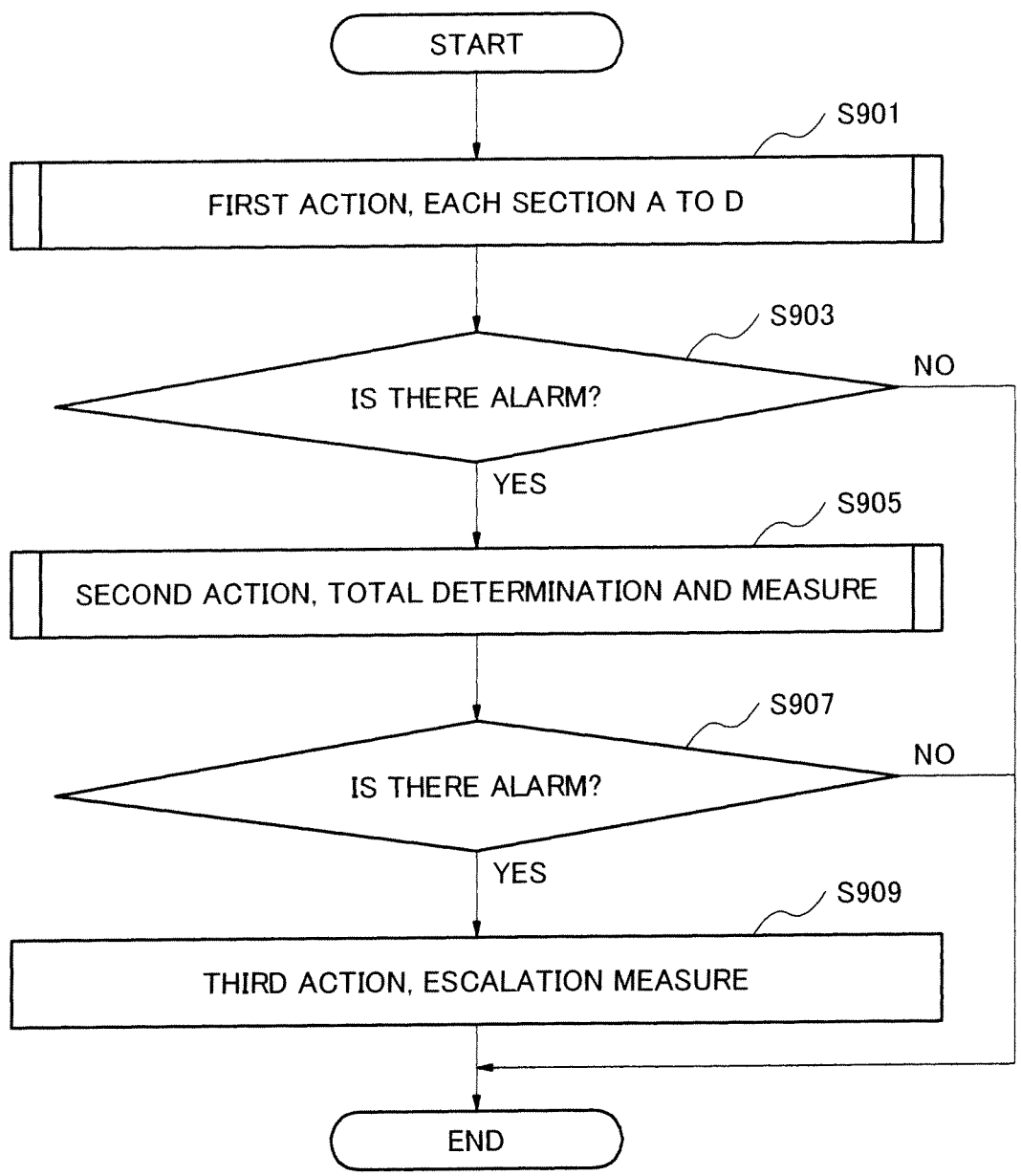
FIG. 9 is a flowchart illustrating a process flow of a recovery support program.

Next, the recovery support server 212 activates a recovery support program (FIG. 9, FIG. 10).

When starting a first action based on the recovery support program, the recovery support server 212 receives a confirmation result for alarm from the terminal 275 of the user operation section and the terminal 235 of the communication carrier. The recovery support server 212 transmits the first action to each terminal based on the confirmation result for alarm sent from the terminal 275 and the terminal 275. Specific contents of the transmitted first action are displayed on the terminal in the section which actually performs the first action.

After performing the first action, the terminal 235 of the communication carrier or the terminal 275 of the user operation section inputs the confirmation result and transmits it to the recovery support server 212.

Figure 11:
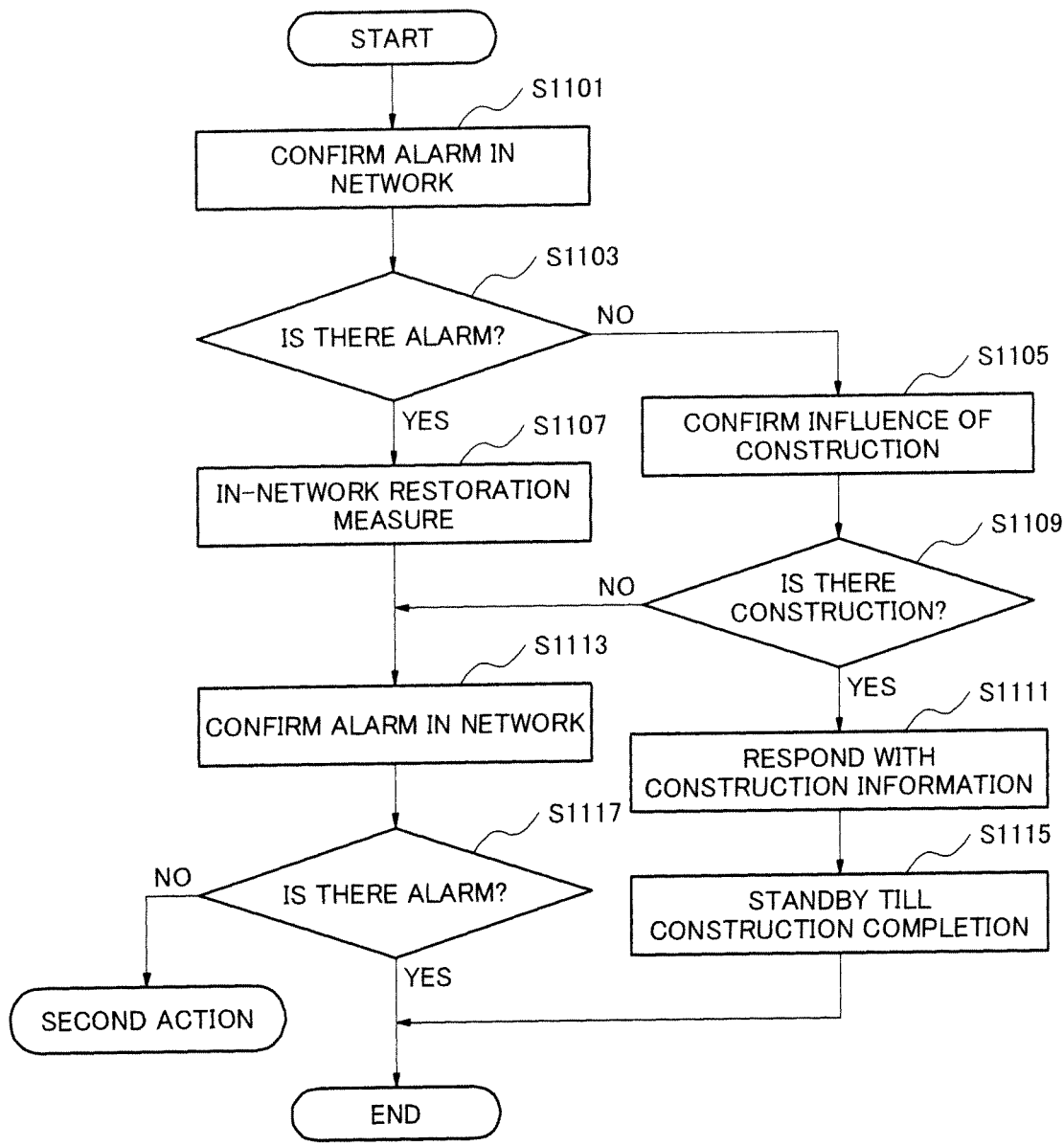
FIG. 11 is a flowchart illustrating a process flow of the recovery support program.
Figure 12:
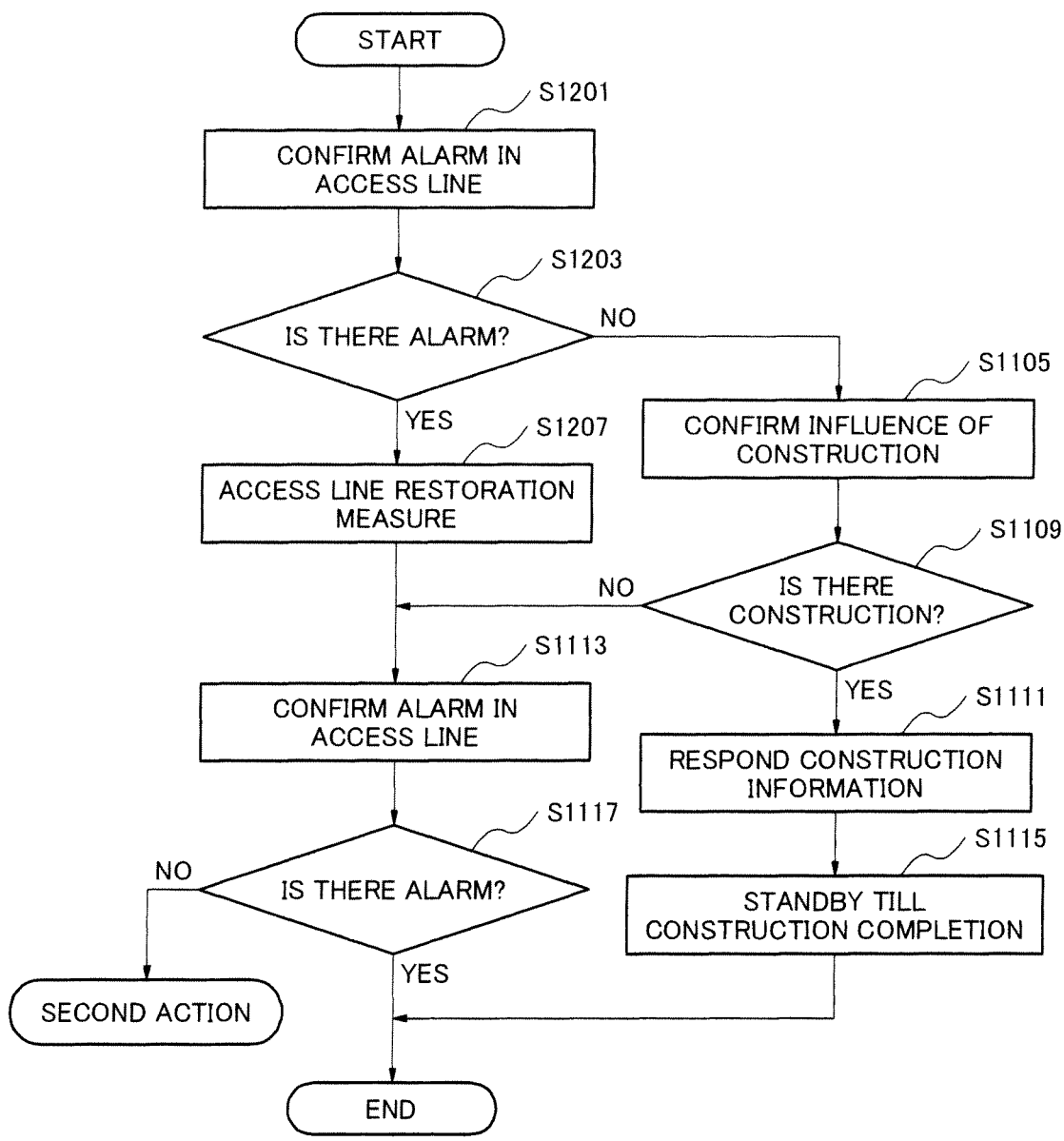
FIG. 12 is a flowchart illustrating a process flow of the recovery support program.
Figure 13:
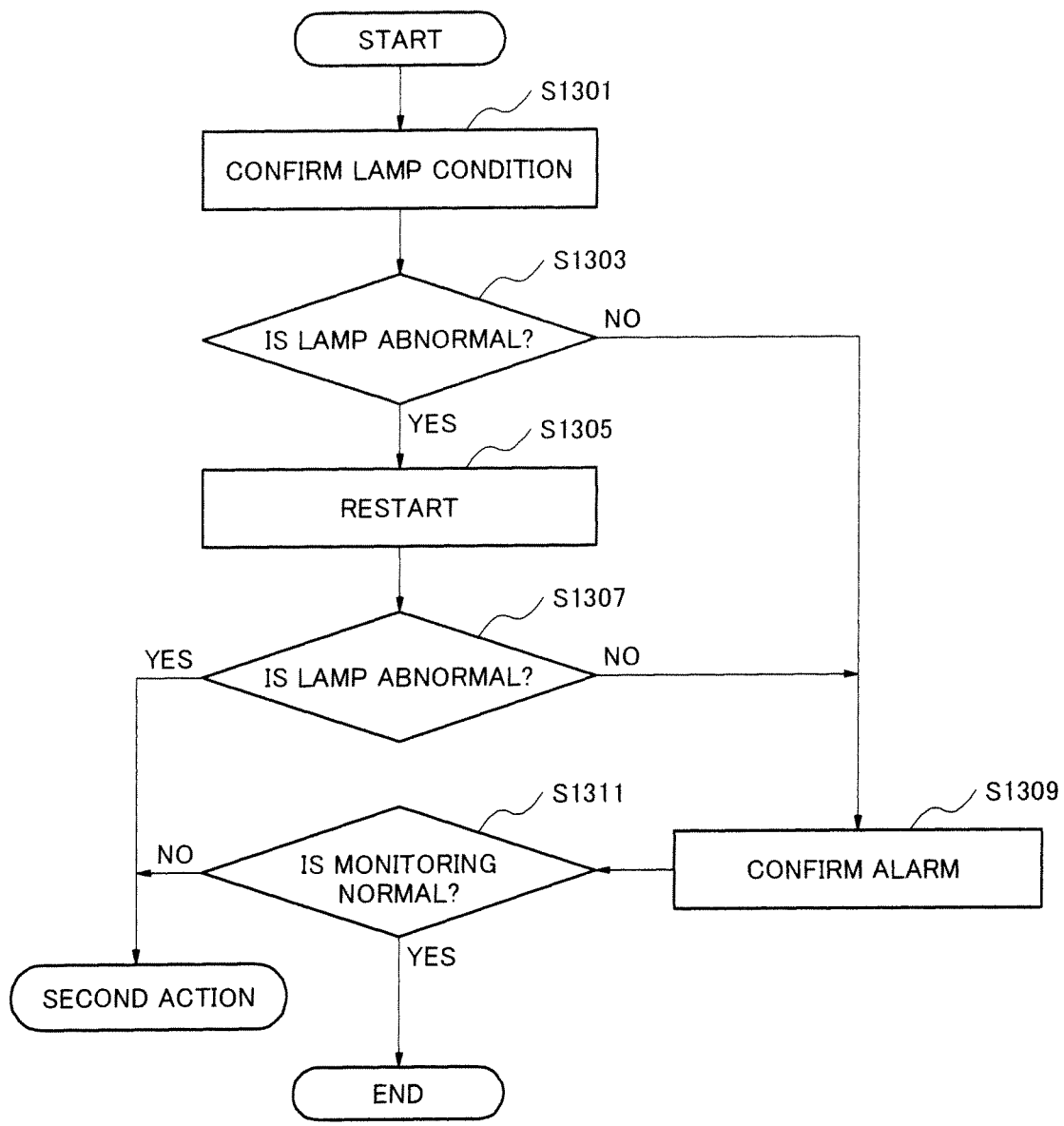
FIG. 13 is a flowchart illustrating a process flow of the recovery support program.

When the monitoring server 211 confirms that the alarm is recovered due to the first action, the recovery measure is completed. When the alarm continues after the first action is taken, a second action is started (FIG. 11, FIG. 12, FIG. 13).

Figure 14:
FIG. 14 is a diagram illustrating contents of a second action of the recovery support program.

In the second action of the recovery support program in the recovery support server 212, an action to be taken is determined on a case-by-case basis based on the result of the first action. The second action, which handles each case which may occurs as a result of the first action, is illustrated in FIG. 14. When each terminal takes the second action, the alarm of the monitoring server 211 stops and communication disconnection is recovered, recovery support is completed. When the alarm continues after the second action is taken at each terminal, a third action starts.

In the third action of the recovery support program in the recovery support server 212, escalation is executed for a technical group having specialized knowledge by an operator of the maintenance center 210, and detailed investigation is conducted until the line failure is recovered (FIG. 15). An action for communication line recovery of the technical group having specialized knowledge does not necessarily include routine steps. The failure recovery communication network 240 is, therefore, used as information transmission means between relevant parties for failure recovery. If recovery levels for the communication line exist, the recovery support server 212 shows the steps according to the recovery support program through the failure recovery communication network 240.

The recovery support server 212 ends the recovery support program and transmits recovery time to each terminal, when the alarm is recovered in the first action to the third action of the recovery support program. The monitoring server 211 removes the alarm and returns to normal monitoring.

While the first to third actions are taken, the terminal 225 of the third party section may confirm line recovery state and status of the action performances.

Figure 3:
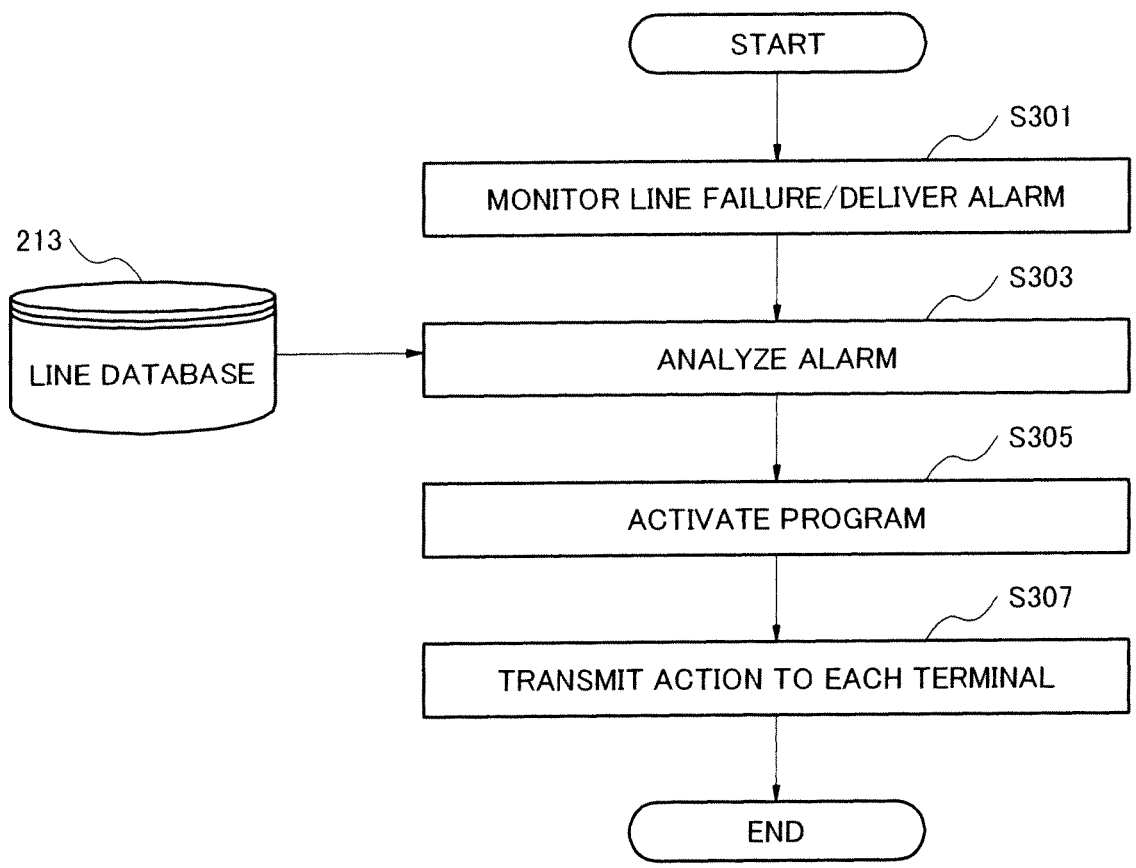
FIG. 3 is a flowchart illustrating a process flow in the system.

FIG. 3 is a flowchart illustrating a process flow of the information processing system 200 as the exemplary embodiment.

In step S301, the monitoring server 211 monitors occurrence of failure in a communication line, and delivers the alarm showing occurrence of failure when line failure, like communication disconnection, is detected. In step S303, receiving the alarm showing occurrence of failure, the recovery support server 212 analyzes the alarm and identifies the user area where line failure occurs based on information on each user line stored in the line database 213. In step S305, the recovery support server 212 activates the recovery support program. In step S307, the recovery support server 212 transmits the action supporting line recovery to each of terminals placed in the communication carrier 230 and the user operation section 270.

Figure 4:
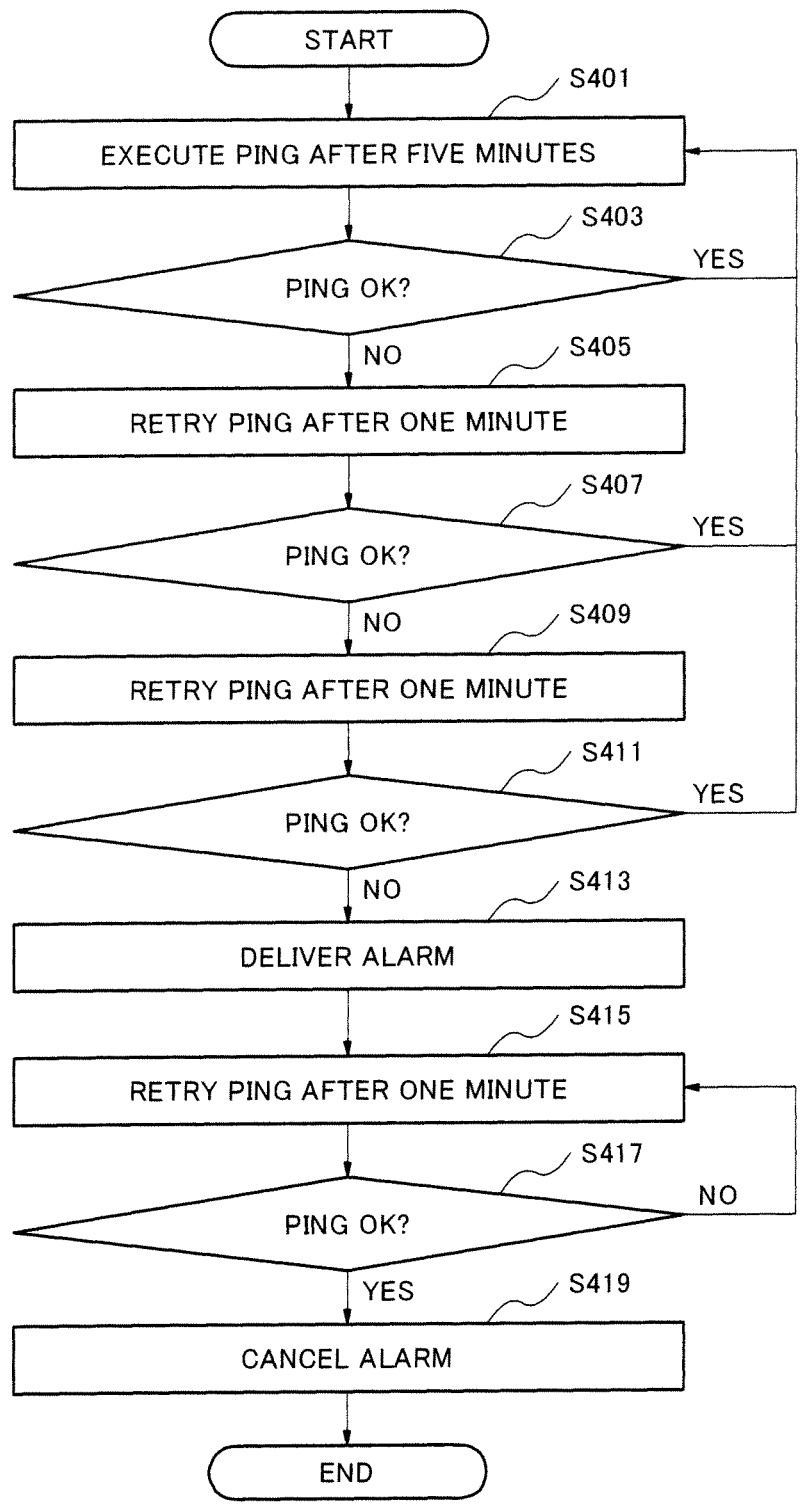
FIG. 4 is a flowchart illustrating a monitoring process flow in a monitoring server.

FIG. 4 is a flowchart illustrating a monitoring process flow in the monitoring server 211 of the exemplary embodiment.

In step S401, the monitoring server 211 executes a ping after five minutes of former execution of the ping. If a reply to the ping is returned in step S403, the ping is executed five minutes later in step S401. After that, if a reply to the ping is returned, the ping is executed at 5 minutes interval. If a reply to the ping is not returned, the monitoring server 211 executes the ping one minute later again in step S405. If a reply to the ping is not returned in step S407, the monitoring server 211 executes a ping one minute later again in step S409. If a reply to the ping is not returned in step S411, the monitoring server 211 delivers an alarm in step S413. In step S415, the monitoring server 211 executes a ping one minute later after alarm delivery. In step S417, if a reply to the ping is not returned, a ping is executed one minute later again. If a reply to the ping is returned, the monitoring server 211 removes the alarm in step S419.

Figure 5:
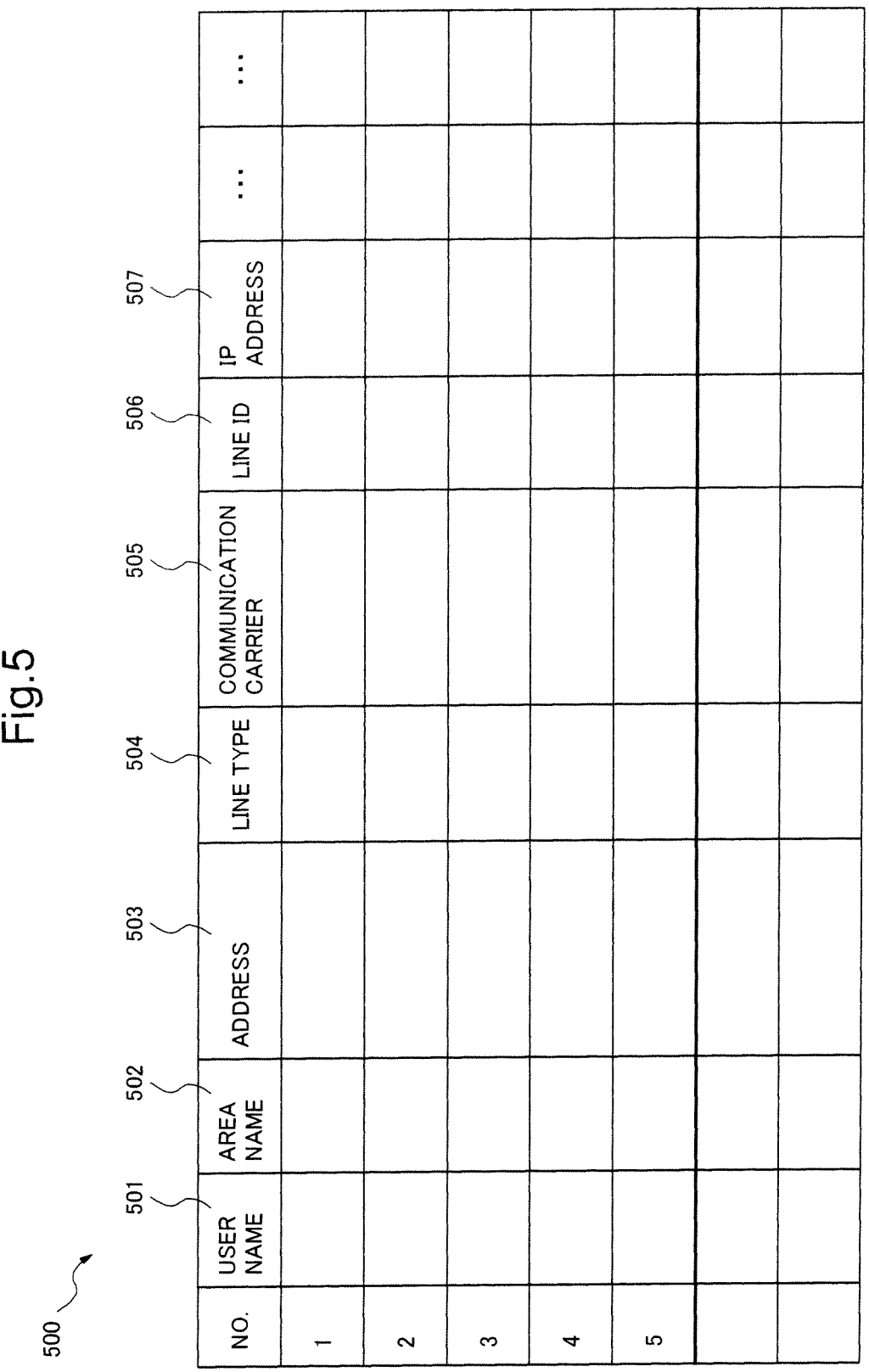
FIG. 5 is a table of user information stored in a line database.

FIG. 5 is a diagram illustrating a table 500 of user information stored in the line database 213 of the exemplary embodiment.

The table 500 of the user information stores a user name 501, an area name 502, an address 503, a line type 504, a communication carrier 505, a line ID 506, and an IP address 507. Information stored in the table as the user information is not limited to the above.

FIG. 6 is a diagram illustrating action contents 600 displayed on the terminal 215 in the maintenance center 210.

A reference numeral 601 denotes alarm information. The alarm information includes a time and date of occurrence of a line failure, a status, a time and date of recovery, a user name, a user area name, a line type and a line ID.

A reference numeral 602 denotes a recovery state of the communication line. A line diagram illustrates the user communication network (carrier network) 250, the access line 251, the line terminating device 261, the communication cable 263, and the WAN router 262. Sections A, B, C and D correspond to the user communication network (carrier network) 250, the access line 251, the line terminating device 261, and the communication cable 263 and the WAN router 262, respectively. Suspicion illustrates in which of the sections A to D anomaly exists. A reference numeral 603 denotes confirmation and action status. Confirmation items in a confirmation status field are an in-network alarm in the Section A, an access line alarm in the Section B, and a lamp condition in the Section C and the Section D. When information from each terminal is received and confirmation of the confirmation items is completed, a result is inputted. A reference numeral 604 denotes a message entry field. If there is a message on an occurring line failure, the message is inputted therein.

FIG. 7 is a diagram illustrating action contents 700 displayed on the terminal 275 of the user operation section 270.

Reference numerals 701, 702, 703, and 704 denote the alarm information, the recovery state of the communication line, the confirmation and action status, and the message entry field, respectively. The reference numerals 701 to 704 correspond to the reference numerals 601 to 604 in FIG. 6. In the confirmation and action status 703, result entry fields of the confirmation status field in the Section A and the Section B are displayed. This means that when the first action from the recovery support server 212 is taken, confirmable sections in the user operation section 270 are limited to the Section A and the Section B.

FIG. 8 is a diagram illustrating action contents 800 displayed on the terminal 235 in the communication carrier 230.

Items of reference numerals 801 to 804 correspond to the reference numerals 601 to 604 in FIG. 6. In the confirmation and action status 803, entry fields of the confirmation status field in the Section C and the Section D are displayed. This means that when the first action from the recovery support server 212 is taken, confirmable sections in the communication carrier 230 is limited to the Section C and the Section D.

FIG. 9 is a flowchart illustrating a process flow of the recovery support program.

In step S901, the recovery support program takes the first action and confirms in which of the sections A to D where the monitoring server confirms a failure occurs. In step S903, the alarm information is confirmed, and the first action is completed if the alarm information is removed. If the alarm is not removed in step S903, the second action is taken, total determination is carried out, and a coping measure is instructed to each terminal. If the alarm information is not removed in step S907, the third action is taken and an escalation measure is instructed.

FIG. 10 is a diagram illustrating a line diagram of the section A to D which the monitoring server 211 monitors, and confirmation items of each section.

A reference numeral 1001 denotes the line diagram of the sections A to D. A reference numeral 1002 denotes a name of each section, a person in charge of maintenance, and contents of the first to third actions. The name of the section A is the carrier network, and the person in charge of maintenance is the communication carrier. It is illustrated that a responder of the first action is the communication carrier, the confirmation items are the in-network alarm and construction information, and the actions are restoration measures and standby for construction. It is shown that the second action of the section A is not taken. The name, the person in charge of maintenance, and the first action in the B action are the same as those of the section A. In the second action in the section B, a responder is the communication carrier, the confirmation item is a line test, and the action is restoration handling. The confirmation items in the section C and the section D are similar to the above.

Furthermore, for example, the in-network alarm indicates an alarm which occurs by communication failure and the construction indicates a construction for switching networks.

FIG. 11 is a flowchart illustrating a process flow of the recovery support program in the section A. A step between step S1101 and step S1113 and between S1101 and step S1115 corresponds to the first action for section A in step S901 in FIG. 9. Step S1117 corresponds to step S903 in FIG. 9.

In step S1101, the recovery support program confirms the alarm information in the network. In step S1103, the recovery support program proceeds to step S1107 and perform restoration measures in the network, if the alarm information is found. When the alarm information is not found, influence of the construction is confirmed in step S1105. If the construction is performed in step S1109, the recovery support program proceeds to step S1111 and sends information on the construction to each terminal, and further proceeds to step S1115 and waits till completion of the construction. When the construction is not performed, the recovery support program proceeds to step S1113 and confirms the alarm in the network by checking a state of the monitoring server 211. In step S1117, when it is confirmed that monitoring by the monitoring server is normal, the first action ends. If it is determined that the monitoring by the monitoring server is not normal, the recovery support program takes the second action.

FIG. 12 is a flowchart illustrating a process flow of the recovery support program in the section B. A step between step S1201 and step S1113 and between step S1201 and step S1115 corresponds to the first action for section B in step S901 in FIG. 9. Step S1117 corresponds to step S903 in FIG. 9.

In step S1201, the recovery support program confirms alarm information in the access line. In step S1203, when there is alarm information, the recovery support program proceeds to step S1207 and carries out restoration measures for the access line. If there is not alarm information, the influence of the construction is confirmed in step S1105. The following process is the same as that of the section A. Therefore, descriptions thereon are omitted.

FIG. 13 is a flowchart illustrating a process flow of the recovery support program in the section C and the section D. A step between step S1301 and step S1307 and between step S1301 and step S1309 corresponds to the first action for section C in step S901 in FIG. 9. Step S1311 corresponds to step S903 in FIG. 9.

In step S1301, the recovery support program confirms a lamp condition. In step S1303, if the lamp is abnormal, the recovery support program instructs the user operation section to restart. After the restart is carried out in step S1305, it is confirmed whether or not the lamp is abnormal in step S1307. If the lamp is not abnormal, the alarm of the monitoring server is confirmed in step S1309. Next, in step S1311, if normal monitoring is performed, the action ends. If the lamp is abnormal in step S1307, or if the monitoring is not normally performed in step S1311, the recovery support program takes the second action.

FIG. 14 is a diagram illustrating contents 1400 of the second action.

In these four cases (1) to (4), the alarm continues after the first action, the section A (carrier network) is normal, and the section B (access line) may be abnormal.

In this situation, like the case (1), when anomaly occurs in the section C (line terminating device), the line terminating device is shown as a suspicious part, and a request for replacement to the communication carrier is defined as the second action. Like the case (2), when anomaly occurs in the section D (cable or router), the router is shown as a suspicious part, and a request for detailed investigation of the router to the user is defined as the second action. Like the case (3), when anomaly occurs in the section C and the section D, the line terminating device and the router are shown as suspicious parts, and the request for replacement to the communication carrier and the request for detailed investigation of the router to the user are defined as the second action. Like the case (4), when anomaly occurs in the section B (access line), the access line is shown as a suspicious part, and the request for replacement to the communication carrier is defined as the second action.

FIG. 15 is a diagram illustrating contents 1500 of the third action.

The third action is an action to be taken when the alarm is not cancelled despite performance of the first action and the second action in the recovery support program. When the alarm continues even though anomaly disappears in the sections A to D monitored by the monitoring server 211, execution of escalation as the third action is urged.

As described above, in the exemplary embodiment, the maintenance center is arranged, which performs monitoring a range from the communication carrier network to the WAN router and failure recovery measures. Further, the maintenance center includes the recovery support server to efficiently perform recovery of a line failure and the monitoring server. The terminals of the recovery support server are arranged not only at the maintenance center but at the user operation section and the communication carrier to enable situation confirmation and result entry at a plurality of places.

By totally determining a failure situation and performing recovery measures in the recovery support server, it is possible to efficiently perform failure recovery in a short time even though any line type or any communication carrier's line service is used. Further, when the process is disclosed to third parties, like a sale section, which wants to share the information, relevant parties understand the failure recovery state and do not have to ask the maintenance center about the recovery state successively.

That is, it is possible to simultaneously deliver alarms notifying of occurrence of a line failure to the terminals arranged at each section which are necessary for recovery measures of line disconnection. By enabling browse of information on a recovery state of the line failure and entry of information through the terminals, it is possible to share confirmation of the recovery state of the line failure and information on the measures in the user operation section and the communication carrier, at the same time. By totally determination measure result for the line failure and performing next measures using the recovery program, it is possible to efficiently perform the measures for the failure and reduce a period of time from occurrence of the failure to recovery.

Since a measure corresponding to each of line services including different purpose, quality, cost, or the like, or common measures can be performed in the maintenance center, a user can use a maintenance service for entire WAN lines in a versatile manner without depending on the communication carrier and a type of line service.

(3) Third Exemplary Embodiment

Figure 16:
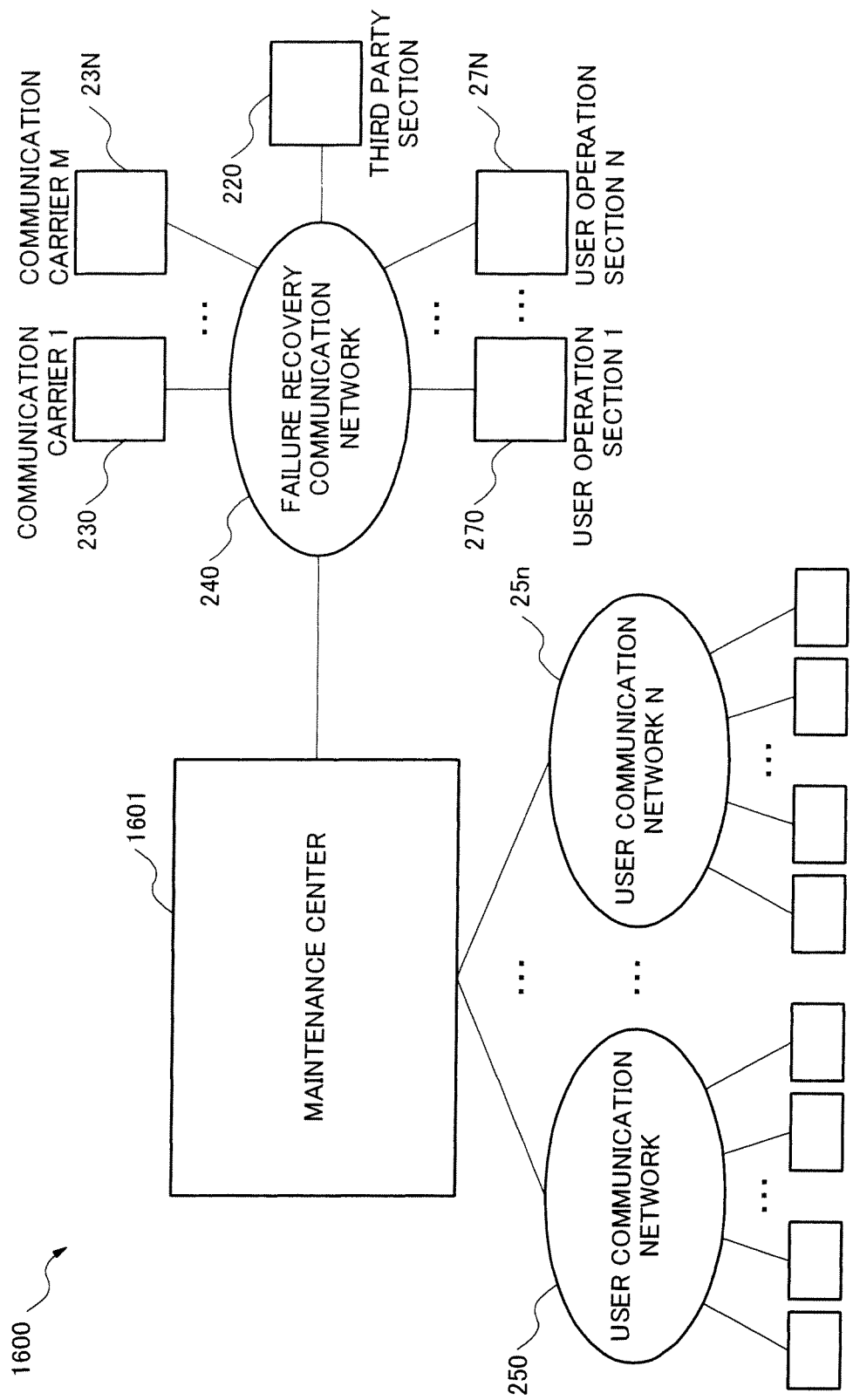
FIG. 16 is a block diagram illustrating a configuration of a system in a third exemplary embodiment of the present invention.

An system such as an information processing system 1600 of a third exemplary embodiment of the invention is described using FIG. 16.

Recovery support for a plurality of users may be performed as an exemplary embodiment of the invention. In this case, as shown in FIG. 16, a maintenance center 1601 has a connection with a user communication network of each user and a monitoring server in the maintenance center 1601 monitors each area in each of user communication networks 250 to 25N. Meanwhile one failure recovery network 240 is enough. The failure recovery network 240 connects with the communication carriers 230 to 23N which each user of the user operation sections 270 to 27N contracts with, and a monitoring terminal is arranged respectively. A user maintenance section can provide many users with a maintenance service due to the above configuration. The more the number of users increases, the more the merit increases concerning the number of operators and cost for delivery, compared with the case in which the invention is not utilized.

Based on the above configuration, according to the information processing system of the exemplary embodiment, even though a plurality of user communication lines are arranged, it is possible to share confirmation of the recovery situation of the line failure and information on the measures in the user operation section and the communication carrier, at the same time.

(4) Fourth Exemplary Embodiment

Figure 17:
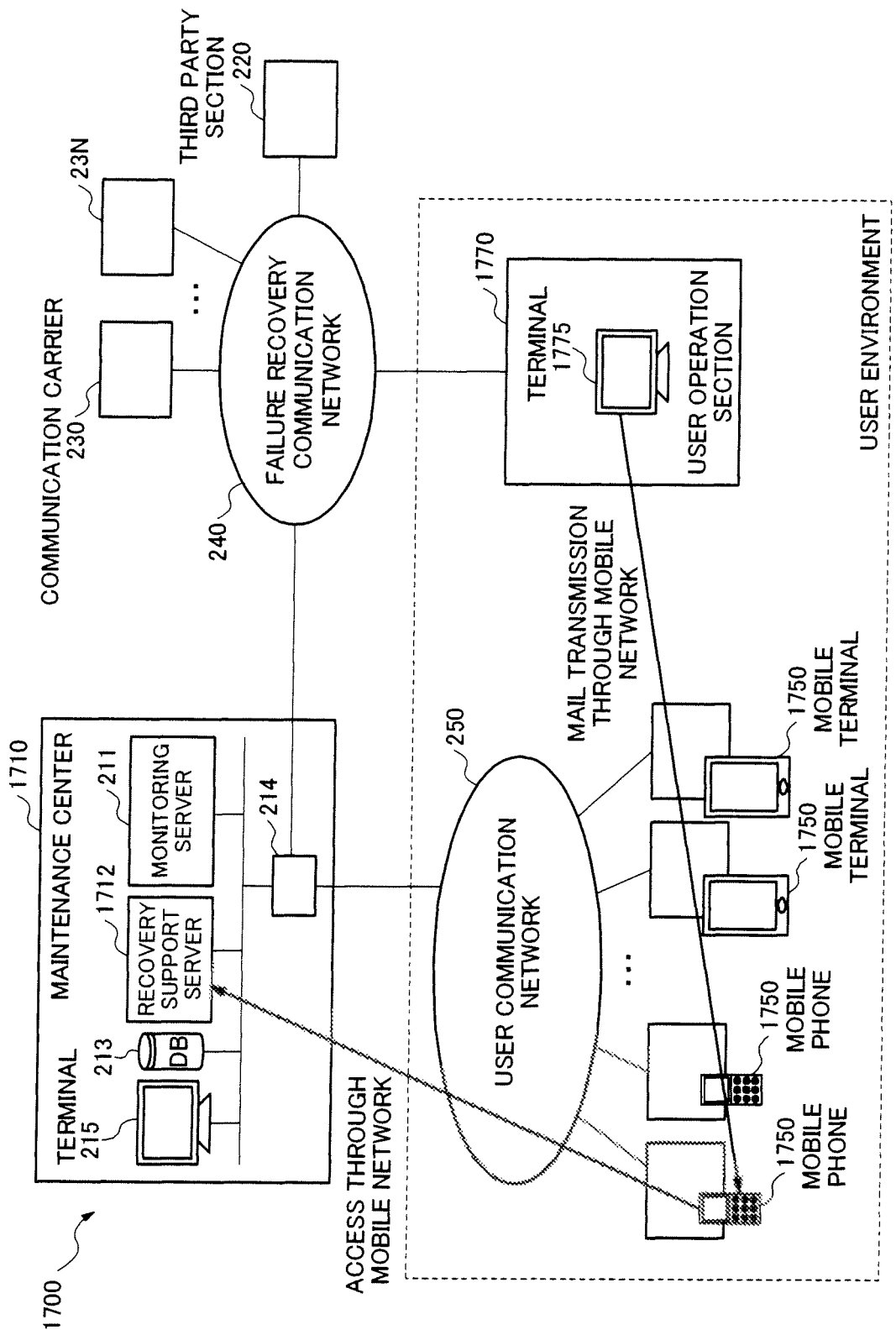
FIG. 17 is a block diagram illustrating a configuration of a system in a fourth exemplary embodiment of the present invention.

An system such as an information processing system 1700 of a fourth exemplary embodiment of the invention is described using FIG. 17.

Many users typically concentrate operation works for a network including a line into a section, like an information system unit, consisting of personnel having a special knowledge, and make the section be a single window for handling inquiry to a communication carrier. However, if a user area is located in a place which is physically separated from a user operation section when a failure occurs in facilities in the user area, like a line terminating device, a telephone call is used in order to confirm a condition of the user area. In order to improve efficiency on the above, it is required to deliver failure information to the user area where the failure occurs and to enable confirmation and measures in the user area based on the failure information.

As one measure for the above requirement, it is possible to develop the failure information from the terminal of the user operation section to the user area, enable access from the user area to the failure recovery server and enable browse and entry of information equivalent to that of the user operation section. In the case, a portable terminal, like a mobile phone, of a responder of the user area may be used so that the user area can transfer the information without determining the failure recovery network. A recovery support server 1712 in the information processing system 1700 of the exemplary embodiment transmits the failure information on a communication line to a user's mobile phone (portable terminal) 1750. A terminal 1775 of the user operation section may be accessed from the user's mobile phone 1750 and may supply information on a line failure.

A function to transmit the failure information to a given address only has to be added to the terminal 1775 or the recovery support server 1712, and a function to receive access from the user's mobile phone 1750 (Web access is common)

only has to be added to the recovery support server 1712. At the time, it is desirable that communication from the user's mobile phone 1750 to the recovery support server 1712 is encrypted.

Based on the above configuration, according to the information processing system of the exemplary embodiment, even though the user communication line is not available due to a failure, it is possible for a user to confirm a state of the line failure and a recovery state of the line failure successively.

(5) Other Exemplary Embodiment

The exemplary embodiments of the invention are described. Any system or any device which is a combination of different characteristics included in each of the exemplary embodiments is included in the scope of the invention.

The present invention may be applied to a system composed of a plurality of devices and may be applied to a single device. The invention is applicable to a case where the control program to achieve the function of the exemplary embodiment is directly supplied to the system or the device or is supplied from a distance thereto. Therefore, the program which is installed in a computer to cause the computer to achieve the function of the invention, a medium storing the program, and a WWW (World Wide Web) server making the program download are included in the scope of the invention.

[Other Expressions of Exemplary Embodiment]

A part or all of the above exemplary embodiments may be described as following supplementary notes, however, are not limited to the followings

What is claimed is:

1. A server comprising:
a monitor unit configured to monitor a failure of one or more user networks; and
a recovery support unit configured to support a recovery of the failure of one or more user networks,
wherein when detecting an alarm showing occurrence of the failure, the server identifies a user network in which the failure occurs based on both a line information for each user network and the alarm, and notifies the alarm to the plurality of management terminals of the identified user network;
the recovery support unit comprising:
an identification unit configured to identify the user network where the failure occurs based on the line information in a line database and the alarm;
a notification unit configured to notify the alarm to the plurality of the management terminals of the identified user network;
a receiving unit configured to receive confirmation result for the alarm from the plurality of the management terminals; and
a determination unit configured to determine an action for the recovery of the failure based on the confirmation result.

2. The server according to claim 1, wherein the server notifies the alarm to the plurality of the management terminals of the identified user network simultaneously.

3. The server according to claim 1,
wherein the server comprises a storage unit configured to store the confirmation result sent from the management terminal; and
wherein the management terminal updates the confirmation information stored in the storage unit.

4. The server according to claim 1,
wherein when the server monitors an area including a plurality of line sections, the server notifies the alarm for each of the line sections.

5. A server comprising:
a monitor unit configured to monitor a failure of one or more user networks; and
a recovery support unit configured to support a recovery of the failure of one or more user networks,
wherein when detecting an alarm showing occurrence of the failure, the server identifies a user network in which the failure occurs based on both a line information for each user network and the alarm, and notifies the alarm to the plurality of management terminals of the identified user network,
wherein when the server monitors an area including a plurality of line sections, the server notifies the alarm for each of the line sections,
wherein the alarm includes a confirmation item for each of the line sections.

6. The server according to claim 5,
wherein the server notifies a recovery time information showing when the alarm is cancelled.

7. A method, comprising:
monitoring a failure of one or more user networks; and
supporting a recovery of the failure of one or more user networks,
wherein the supporting comprises:
identifying a user network in which the failure occurs based on both a line information for each user network and an alarm showing occurrence of the failure when detecting the alarm; and
notifying the alarm to the plurality of management terminals of the identified user network,
wherein the supporting further comprises:
receiving a confirmation result for the alarm from the plurality of the management terminals; and
determining an action for the recovery of the failure based on the confirmation result.

8. The method according to claim 7,
wherein in the notifying, the alarm to the plurality of the management terminals of the identified user network is notified simultaneously.

9. The method according to claim 7, further comprising:
storing the confirmation result sent from the management terminal in a storage unit,
wherein the confirmation information stored in the storage unit is updated.

10. The method according to claim 7,
wherein an area including a plurality of line sections is monitored in the monitoring step, and the alarm for each of the line sections is notified in the notifying.

11. The method according to claim 10,
wherein the alarm includes a confirmation item for each of the line sections.

12. The method according to claim 11,
wherein a recovery time information showing when the alarm is cancelled is notified in the notifying.

13. A system comprising:
one or more user network;
a plurality of management terminals configured to manage the user network; and
a server configured to monitor a failure of one or more user networks and support a recovery of the failure of one or more user networks,
wherein when detecting an alarm showing occurrence of the failure, the server identifies a user network in which the failure occurs based on both a line information for each user network and the alarm, and notifies the alarm to the plurality of management terminals of the identified user network, wherein the server comprises:

an identification unit configured to identify the user network where the failure occurs based on the line information in a line database and the alarm;
a notification unit configured to notify the alarm to the plurality of the management terminals of the identified user network;
a receiving unit configured to receive confirmation result for the alarm from the plurality of the management terminals; and
a determination unit configured to determine an action for the recovery of the failure based on the confirmation result.

14. A computer readable storage medium recording thereon a program for enabling a computer to carry out the following:
monitoring a failure of one or more user network; and
supporting a recovery of the failure of one or more user network,
wherein the supporting comprises:
identifying the user network in which the failure occurs based on both a line information for each user network and the alarm when detecting an alarm showing occurrence of the failure;
notifying the alarm to the plurality of management terminals of the identified user network; receiving a confirmation result for the alarm from the plurality of the management terminals; and
determining an action for the recovery of the failure based on the confirmation result.

15. The computer readable storage medium according to claim 14,
wherein in the notifying, the alarm to the plurality of the management terminals of the identified user network is notified simultaneously.

\* \* \* \* \*